March 8, 1927.
R. D. MERSHON
1,620,119
EXCITATION OF ELECTROLYTIC CONDENSERS
Filed July 3, 1920    2 Sheets-Sheet 1
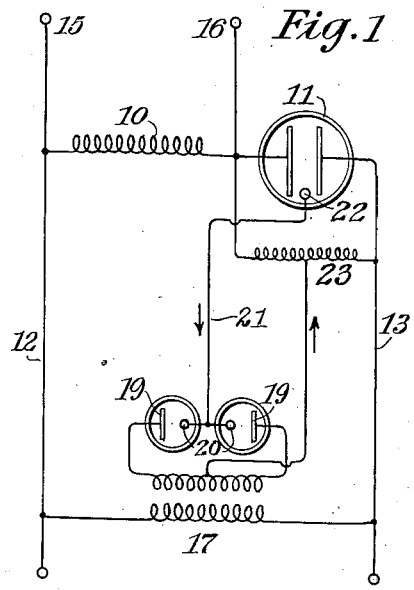
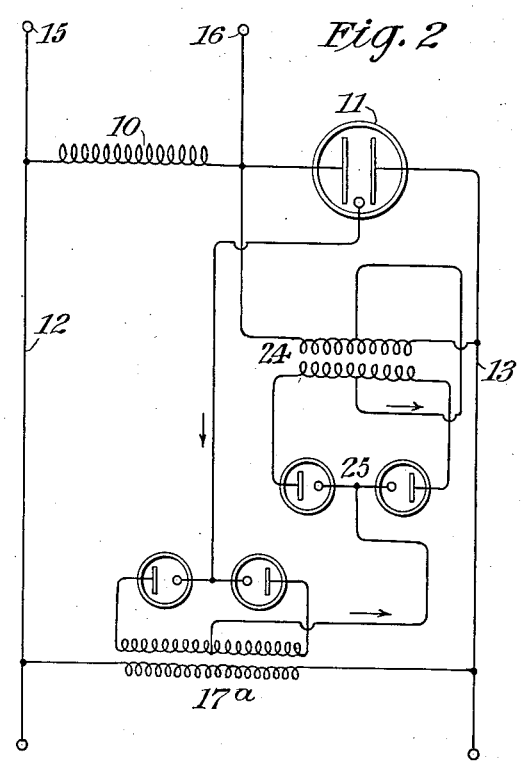
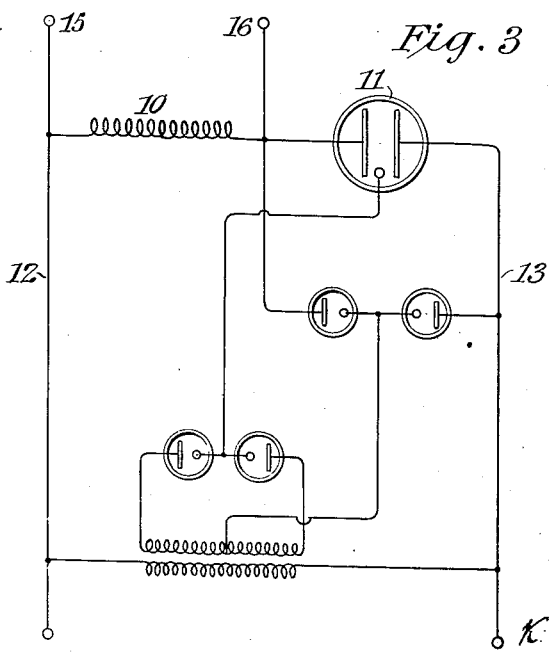
INVENTOR
R. D. Mershon
BY
ATTORNEYS March 8, 1927.

R. D. MERSHON 1,620,119

EXCITATION OF ELECTROLYTIC CONDENSERS

Filed July 3, 1920     2 Sheets-Sheet 2

INVENTOR
R. D. Mershon
BY
Kerr, Page, Cooper & Hayward
ATTORNEYS

Patented Mar. 8, 1927.

1,620,119

UNITED STATES PATENT OFFICE.

RALPH D. MERSHON, OF NEW YORK, N. Y.

EXCITATION OF ELECTROLYTIC CONDENSERS.

Application filed July 3, 1920. Serial No. 393,914.

This invention relates to electrolytic condensers of the excited type, and its chief object is to provide effective and substantially constant excitation from an alternating voltage of the system in which the condenser or condensers are used, although the latter are themselves subjected to a voltage of varying value.

Referring now to the accompanying drawings,

Figs. 1, 2 and 3 show several methods of applying the invention to the system described in the patent of Boucherot, No. 548,511, issued October 22, 1895;

Figure 4:
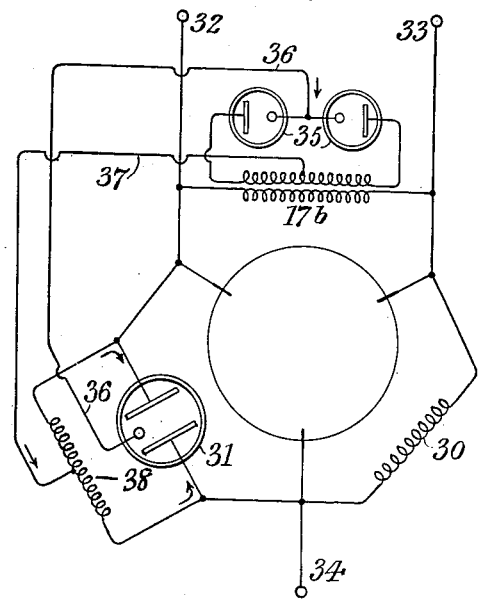
Figs. 4 and 5 show convenient methods of applying the invention to polyphase motors.

It is now well understood in the operation of the electrolytic condenser there exists a negative charge in the electrolyte. If for any reason this charge should leak away or otherwise be dissipated in whole or in part it will be renewed from the alternating E. M. F. impressed upon the condenser, but such replacement is accompanied by flow of current from the electrolyte to the electrodes and causes perforation of the dielectric films on the electrodes, which perforation if repeated often enough will injure and may eventually destroy the electrodes. On the other hand, so long as the negative charge is maintained at a proper value the only electrical stress tending to produce a flow of current through the films is directed from the electrodes toward the electrolyte, and in order to maintain this direction and thus prevent reversal of the film stress it is necessary to maintain the negative charge by impressing a unidirectional voltage on the condenser. In such case the condenser is said to be "excited".

Consider a condenser having a certain normal alternating voltage of operation and suppose that the condenser is excited by voltage from a motor-generator set or other source so that its excitation voltage is substantially constant and independent of the variations of the impressed alternating voltage. In such case, in order to prevent reversal of the film stress, the exciting voltage must always have a value in excess (theoretically only an infinitesimal amount in excess) of one-half the maximum instantaneous value of the alternating voltage impressed on the condenser. In practice, however, it is customary to make the exciting voltage materially greater than the theoretical value required.

Suppose that the exciting voltage be chosen sufficiently in excess of its theoretical correct value and suppose further that the impressed alternating voltage should for one cause or another fall to a value less than normal and after remaining there for a longer or shorter time, suddenly comes back to normal. In such case there will be no reversal of the film stress because both before and after the change of value the negative charge in the electrolyte, maintained by the exciting voltage, is greater than or at least equal to the maximum instantaneous value of the alternating voltage.

But suppose that instead of the exciting voltage being supplied from an independent source it be derived from the impressed alternating voltage, as by means of a rectifier. As before, the maximum instantaneous value of the pulsating E. M. F. from the rectifier need theoretically be only infinitesimally greater than the maximum instantaneous alternating voltage on the condenser, but as a practical matter it should be materially greater for the reasons set forth above. Now suppose the alternating voltage falls. In that case the excitation voltage will fall also, and the negative charge in the electrolyte will begin to leak away, and if the alternating voltage remain at its lower value long enough the charge will fall to a corresponding value. Now suppose the alternating voltage suddenly rises to its normal value. The negative charge cannot instantly rise to its proper value (unless the output capacity of the exciting rectifier be very great) which means, practically, that for the first short period after the alternating voltage has come back to the normal value the condenser will be operating with a negative charge corresponding to the lower value. It follows, therefore, that if the alternating voltage falls to a value low enough and remains there for a sufficient period of time for the negative charge to leak away to a value less than its normal value, there will be a reversal of the film stress when the alternating voltage rises to its normal. Also, if the alternating voltage falls to zero and remains at zero value for sufficient time the negative charge will be entirely lost, with the result that when the voltage rises again, there will be a reversal of the film stress at each half cycle until the negative charge has been built up to a value sufficient to prevent reversal. In the meantime the condenser may be badly damaged.

There are some uses to which a condenser is put, where the alternating voltage on its terminals may vary widely and quickly, even falling to zero, as for example in the method of Boucherot (described in United States Patent No. 548,511 above mentioned) for converting from constant current to constant voltage or vice versa. Another instance is the operation of a polyphase motor operated from a single phase source with no provision for varying (automatically or otherwise) the amount of capacity and reactance connected with the motor as its load varies. Even when such provision is made, the automatic devices may not be able to act quickly enough to follow with sufficient closeness the changes in load and thereby keep the alternating voltage on the condenser terminals substantially constant. In such cases the condenser must be excited from a separate source, or from one which is substantially independent of the alternating voltage across the terminals of the condenser. That is, we must make use of a motor-generator set or else employ a rectifier supplied with an alternating voltage substantially constant and, therefore, independent of that across the condenser.

Although in the situations referred to above, the voltage across the condenser may vary greatly and suddenly, there will be in each case a voltage which will not so vary but will remain substantially constant, namely, the main voltage in the case of the motor, and either the main or the supply voltage in the Boucherot system, and such departures as may take place from the nominally constant values of these voltages can be provided for by making the value exciting E. M. F. enough larger, but not excessively larger, than the theoretical value. In such situations we may successfully employ a condenser excited by a rectifier if we supply the rectifier from the circuit of substantially constant voltage instead of from the terminals of the condenser.

Referring to Figs. 1, 2 and 3, 10 and 11 represent respectively an inductance and an electrolytic condenser in series with each other and connected by leads 12, 13 to a source of alternating current of substantially constant voltage. As explained in the Boucherot Patent No. 548,511, above referred to, if the reactance 10 and capacity 11 are properly chosen, the current in a circuit in shunt with either device, for example a circuit connected with the terminals 15, 16, will be substantially constant in value even though the resistance of the shunt circuit vary within wide limits. Conversely, if instead of connecting 12 and 13 to the source of alternating current, a constant current be maintained between the terminals 15, 16, there will result a substantially constant voltage between leads 12 and 13, even though the resistance of the load across these leads varies widely. Nevertheless, in the first instance as the resistance of the load across the terminals 15 and 16 varies, and in the second instance as the resistance of the load across terminals 12 and 13 varies, the voltage at the condenser terminals (and at the reactance terminals) will also vary. Hence if the exciting voltage of the condenser is a direct function of the voltage across the condenser terminals, the films on the condenser electrodes may sooner or later suffer injury.

To obviate this disadvantage the condenser, according to the present invention, is excited by a unidirectional voltage which is dependent upon the substantially constant E. M. F. across the leads 12, 13, and is therefore itself substantially constant. For this purpose I connect across the leads 12, 13 a transformer 17, Fig. 1, the secondary terminals of which are connected to a suitable rectifier, in the present instance a rectifier of the electrolytic type, comprising filmed plates or anodes 19 to which the said secondary terminals are connected, and unfilmed rods or cathodes 20. The latter are connected by a wire 21 to the cathode 22 of the condenser 11, while the neutral point of the transformer secondary is connected to the neutral point of a balance coil 23 across the condenser terminals. From the fact that current can readily flow from cathodes 20 to anodes 19 but not in the reverse direction it will be seen that when the system is in operation there can exist a unidirectional E. M. F. in the direction of the arrows. This is the condenser exciting voltage and since it is dependent upon the constant voltage across the transformer 17 it will itself be constant, and by suitable design or adjustment of the transformer it can always be equal to $$\tfrac{1}{2}E\sqrt{2}$$

or as much greater as may be necessary or desirable under the circumstances. The result is that the films on the condenser anodes can suffer no material injury, if any, no matter how widely or for how long a time the alternating voltage across the condenser terminals may vary.

In the arrangements shown in Figs. 2 and 3 the exciting voltage is dependent partly upon the constant voltage across leads 12 and 13 and partly upon the voltage of another part of the system,—in the present instances the voltage across the condenser terminals. Thus in Fig. 2 a second transformer, 24, connected across the condenser and to transformer 17ª through a rectifier 25, supplies part of the exciting voltage. If the voltage desired across the terminals of the latter rectifier need be no greater than that across the condenser, the second transformer may be omitted, as in Fig. 3.

In arrangements in which the exciting voltage is dependent in part upon the voltage across the condenser terminals and in part upon the constant voltage, as in Figs. 2 and 3, the exciting voltage will not, in general, fall below a safe minimum; but as the variable voltage increases, the exciting voltage will also increase, and hence it is possible to reduce, in some cases quite materially, the output capacity of the transformer and rectifier fed by the constant voltage.

Figure 5:
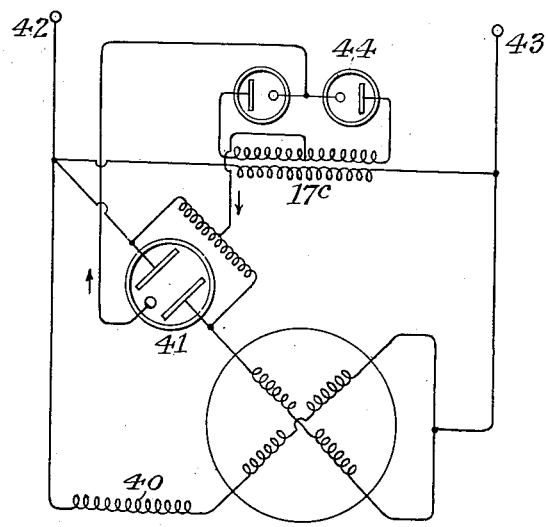

Figs. 4 and 5 illustrate methods of applying the invention to motors with which condensers are used for phase-modification, as for example polyphase motors to make the same self-starting on single phase circuits. In Fig. 4 a three-phase (or three wire quarter-phase) motor is shown, having reactance 30 and capacity 31 (an electrolytic condenser) in parallel with the respective motor circuits. The motor terminals are shown at 32, 33, 34 and across two of them, 32, 33, which may be considered the terminals of the main or single phase circuit of substantially constant voltage, is a transformer 17$^b$ having its secondary terminals connected to a rectifier 35, the cathodes of which are connected by wire 36 to the cathode of condenser 31. The neutral point of the transformer secondary is connected by wire 37 to the neutral point of a balance coil 38 across the condenser terminals. The exciting voltage is thus dependent upon the main voltage across motor terminals 32, 33, and its direction is as indicated by the arrows. In Fig. 5, which shows a quarter-phase motor in which the reactance 40 and condenser 41 are in series with their respective motor circuits, the condenser is excited from the substantially constant main voltage existing across the motor terminals 42, 43, through the medium of transformer 17$^c$ and rectifier 44, the direction of the exciting E. M. F. being indicated by the arrows as before.

It is to be understood that the invention is not limited to the specific details or to the particular applications herein illustrated or described, but can be practised in other ways and for other purposes without departure from its spirit.

I claim—

1. In an alternating current system, the combination with a motor having a plurality of energizing circuits, a source of substantially constant voltage connected with one of said circuits, and electrolytic condenser associated with another of said circuits and thereby subjected to varying voltage, of means dependent upon the substantially constant voltage of the first-mentioned circuit for exciting the condenser.

2. In an alternating current system, the combination with a motor having a plurality of energizing circuits, a source of substantially constant voltage connected with one of said circuits, and electrolytic condenser associated with another of said circuits and thereby subjected to varying voltage, of means for exciting the condenser, said means including a transformer connected across the first-mentioned circuit to supply exciting voltage of substantially constant value.

In testimony whereof I hereunto affix my signature.

RALPH D. MERSHON.